(12) United States Patent
Chang et al.

(10) Patent No.: US 12,192,948 B2
(45) Date of Patent: Jan. 7, 2025

(54) METHOD AND APPARATUS OF POSITIONING FOR ACCOMMODATING WIRELESS-ENVIRONMENT CHANGE

(71) Applicant: ELECTRONICS AND TELECOMMUNICATIONS RESEARCH INSTITUTE, Daejeon (KR)

(72) Inventors: Kap Seok Chang, Daejeon (KR); Seung Chan Bang, Daejeon (KR); Young Jo Ko, Daejeon (KR); Il Gyu Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 525 days.

(21) Appl. No.: 17/524,824

(22) Filed: Nov. 12, 2021

(65) Prior Publication Data

US 2022/0394653 A1    Dec. 8, 2022

(30) Foreign Application Priority Data

Jun. 8, 2021 (KR) .................. 10-2021-0074404
Nov. 8, 2021 (KR) .................. 10-2021-0152055

(51) Int. Cl.
*H04W 64/00* (2009.01)

(52) U.S. Cl.
CPC .................. *H04W 64/00* (2013.01)

(58) Field of Classification Search
CPC .................................................. H04W 64/00
USPC ......................................................... 455/456.1
See application file for complete search history.

(56) References Cited

U.S. PATENT DOCUMENTS

| | | |
|---|---|---|
| 10,180,488 B2 | 1/2019 | Wirola et al. |
| 10,655,971 B1 | 5/2020 | Huberman et al. |
| 11,057,118 B2 | 7/2021 | Mak |
| 2012/0155311 A1 | 6/2012 | Bang et al. |
| 2018/0089566 A1 | 3/2018 | Li et al. |
| 2021/0084614 A1* | 3/2021 | Ananth ............... H04W 64/006 |
| 2021/0183094 A1 | 6/2021 | Son et al. |
| 2022/0295224 A1 | 9/2022 | Li et al. |

FOREIGN PATENT DOCUMENTS

| | | |
|---|---|---|
| KR | 10-2018-0040841 A | 4/2018 |
| KR | 10-2020-0017611 A | 2/2020 |
| KR | 10-2021-0085582 A | 7/2021 |
| WO | 2021/027400 A1 | 2/2021 |

* cited by examiner

*Primary Examiner* — Rasha S Al Aubaidi
*Assistant Examiner* — Jirapon Tulop
(74) *Attorney, Agent, or Firm* — LRK PATENT LAW FIRM

(57) ABSTRACT

A beam fingerprint-based positioning method, performed by a communication node located in a target space, may include: performing measurements on positioning signals transmitted from at least one reference node through a plurality of directional beams in a beam sweeping scheme; transmitting a result of the measurements to a central node; and receiving information on a position of the communication node from the central node.

17 Claims, 14 Drawing Sheets

METHOD AND APPARATUS OF POSITIONING FOR ACCOMMODATING WIRELESS-ENVIRONMENT CHANGE

CROSS-REFERENCE TO RELATED APPLICATIONS

This application claims priority to Korean Patent Applications No. 10-2021-0074404 filed on Jun. 8, 2021, and No. 10-2021-0152055 filed on Nov. 8, 2021 with the Korean Intellectual Property Office (KIPO), the entire contents of which are hereby incorporated by reference.

BACKGROUND

1. Technical Field

The present disclosure relates to methods and apparatuses for positioning, and more particularly, to methods and apparatuses that adapt to a real wireless environment with an environmental change by using a wireless communication system having beamforming capability and positioning techniques based on learning/image/mathematical algorithms.

2. Description of Related Art

In wireless communication, positioning refers to estimating a position of a wireless terminal or wireless device. Basically, for positioning, a coordinate of a target device should be identified, and the coordinate should be mapped to a map. The former is called positioning and the latter is called localization. When a reference node (e.g., a node that transmits or receives a signal used for positioning, such as a base station, an access point (AP), a beacon node, etc.) is used in a positioning system, the two terms are not distinguished.

The wireless communication positioning techniques up to now use mathematical approaches to determine a user's position in an indoor or outdoor environment based on various signals received from a mobile device or through a wireless channel. However, a fatal problem of such the mathematical approaches is that they may have a very high positioning error in the presence of multiple paths. As a means to solve such the problem, deep learning-based neural networks are recently applied. Most of the deep learning technologies applied to positioning so far are based on indoor positioning, and they are characterized in applying the existing fingerprint scheme through learning using a deep learning model. As input data for the fingerprint scheme, channel state information (CSI), received signal strength (RSS), channel impulse response (CIR), and/or hybrid information is used.

The conventional deep learning-based positioning techniques have the following problems. There is a question mark in objectification and generalization of a positioning performance due to an inconsistency between data used for learning in a model construction environment and data used in actual application to a real environment. The persuasiveness that the learning model showing excellent positioning performance in the model construction environment preserves the performance even in the real environment where new fixed/moving objects are introduced into a target space of the environment is weak. A received signal reflecting the influence of the new fixed/moving objects may not be part of the input data used in the model construction environment, and in this reason, there is a possibility that the positioning performance may be deteriorated. In addition, in the real environment, it is required to consider the effects of omission of received signal strength information, a case where a light bulb is turned off when using illuminance sensors, and environmental changes caused by temperature and unconsidered people/objects. Therefore, there is a need for methods to overcome the degradation of positioning accuracy performance due to a low correlation (or inconsistency) between the input data used for learning in the model construction environment and the actual data in the real environment.

SUMMARY

Accordingly, exemplary embodiments of the present disclosure are directed to providing an operation method of a communication node (i.e., positioning target node) located in a target space, which performs positioning based on beam fingerprints.

Accordingly, exemplary embodiments of the present disclosure are directed to providing an operation method of a central node performing beam fingerprint-based positioning for the communication node (i.e., positioning target node) located in the target space.

Accordingly, exemplary embodiments of the present disclosure are directed to providing a configuration of the communication node (i.e., positioning target node) located in the target space, which performs positioning based on beam fingerprints.

According to a first exemplary embodiment of the present disclosure, a beam fingerprint-based positioning method, performed by a communication node located in a target space, may comprise: performing measurements on positioning signals transmitted from at least one reference node through a plurality of directional beams in a beam sweeping scheme; transmitting a result of the measurements to a central node; and receiving information on a position of the communication node from the central node.

The central node may be one of the at least one reference node.

In the performing of the measurements, a received signal strength (RSS), channel state information (CSI), modified CSI, a channel impulse response (CIR), and/or a magnetic field for each of the positioning signals may be measured.

The central node may select at least one beam least affected by an environmental change among the plurality of directional beams by inputting the received result of the measurements to learning models each of which is generated for each of the plurality of directional beams at each of a plurality of reference positions existing in the target space, and may determine an estimated position of the communication node based on learning models for reference positions for the selected at least one beam and the received result of the measurements.

The information on the position of the communication node may be determined based on the estimated position and a result of at least one of an image-based positioning, a radar-based positioning, an Angle of Array (AoA)-based positioning, or a Time Difference of Arrival (TDoA) or Time of Arrival (AoA) positioning for the communication node.

The learning models may be generated through deep learning using input data collected based on the measurements on the positioning signals transmitted from the at least one reference node through the plurality of directional beams.

The input data may be collected for various time zones, various seasons, and/or various human-thing environment change scenarios of the target space.

The learning models may be generated by one reference position node performing measurements on the positioning signals while moving to the plurality of reference positions, or a plurality of reference position nodes performing measurements on the positioning signals, which are respectively located at the plurality of reference positions, and the plurality of reference positions may be preconfigured in the target space or determined by the one reference position node or the plurality of reference position nodes.

According to a second exemplary embodiment of the present disclosure, a beam fingerprint-based positioning method, performed by a central node for positioning in a target space, may comprise: receiving, from a communication node, a result of measurements on positioning signals transmitted from at least one reference node through a plurality of directional beams in a beam sweeping scheme; determining a position of the communication node based on the result of the measurements; and transmitting information on the position of the communication node to the communication node.

The central node may be one of the at least one reference node.

The result of the measurements may include a received signal strength (RSS), channel state information (CSI), modified CSI, a channel impulse response (CIR), and/or a magnetic field for each of the positioning signals.

The determining of the position may comprise: selecting at least one beam least affected by an environmental change among the plurality of directional beams by inputting the received result of the measurements to learning models each of which is generated for each of the plurality of directional beams at each of a plurality of reference positions existing in the target space; and determining an estimated position of the communication node based on learning models for reference positions for the selected at least one beam and the received result of the measurements.

The information on the position of the communication node may be determined based on the estimated position and a result of at least one of an image-based positioning, a radar-based positioning, an Angle of Array (AoA)-based positioning, or a Time Difference of Arrival (TDoA) or Time of Arrival (AoA) positioning for the communication node.

The learning models may be generated through deep learning using input data collected based on the measurements on the positioning signals transmitted from the at least one reference node through the plurality of directional beams.

The input data may be collected for various time zones, various seasons, and/or various human-thing environment change scenarios of the target space.

The learning models may be generated by one reference position node performing measurements on the positioning signals while moving to the plurality of reference positions, or a plurality of reference position nodes performing measurements on the positioning signals, which are respectively located at the plurality of reference positions, and the plurality of reference positions may be preconfigured in the target space or determined by the one reference position node or the plurality of reference position nodes.

According to a third exemplary embodiment of the present disclosure, a communication node located in a target space may comprise: a processor; a memory electronically communicating with the processor; and instructions stored in the memory, wherein when executed by the processor, the instructions cause the communication node to: perform measurements on positioning signals transmitted from at least one reference node through a plurality of directional beams in a beam sweeping scheme; transmit a result of the measurements to a central node; and receive information on a position of the communication node from the central node.

The central node may select at least one beam least affected by an environmental change among the plurality of directional beams by inputting the received result of the measurements to learning models each of which is generated for each of the plurality of directional beams at each of a plurality of reference positions existing in the target space, and may determine an estimated position of the communication node based on learning models for reference positions for the selected at least one beam and the received result of the measurements.

The learning models may be generated through deep learning using input data collected based on the measurements on the positioning signals transmitted from the at least one reference node through the plurality of directional beams.

The learning models may be generated by one reference position node performing measurements on the positioning signals while moving to the plurality of reference positions, or a plurality of reference position nodes performing measurements on the positioning signals, which are respectively located at the plurality of reference positions, and the plurality of reference positions may be preconfigured in the target space or determined by the one reference position node or the plurality of reference position nodes.

Using the positioning methods and apparatuses according to the exemplary embodiments of the present disclosure, even when a low correlation between positioning signals in the real environment and positioning signals applied in the model construction environment occurs due to the environmental changes occurring in the real environment, the positioning accuracy can be maintained. That is, learning models for various directional beams are generated in advance, and positioning may be performed based on learning model(s) for a single beam or a plurality of directional beams that are least affected by the environmental changes occurring in the real environment. Accordingly, the high positioning accuracy can be achieved in the wireless communication environment in which environmental changes frequently occur.

DETAILED DESCRIPTION OF THE EMBODIMENTS

Figure 1:
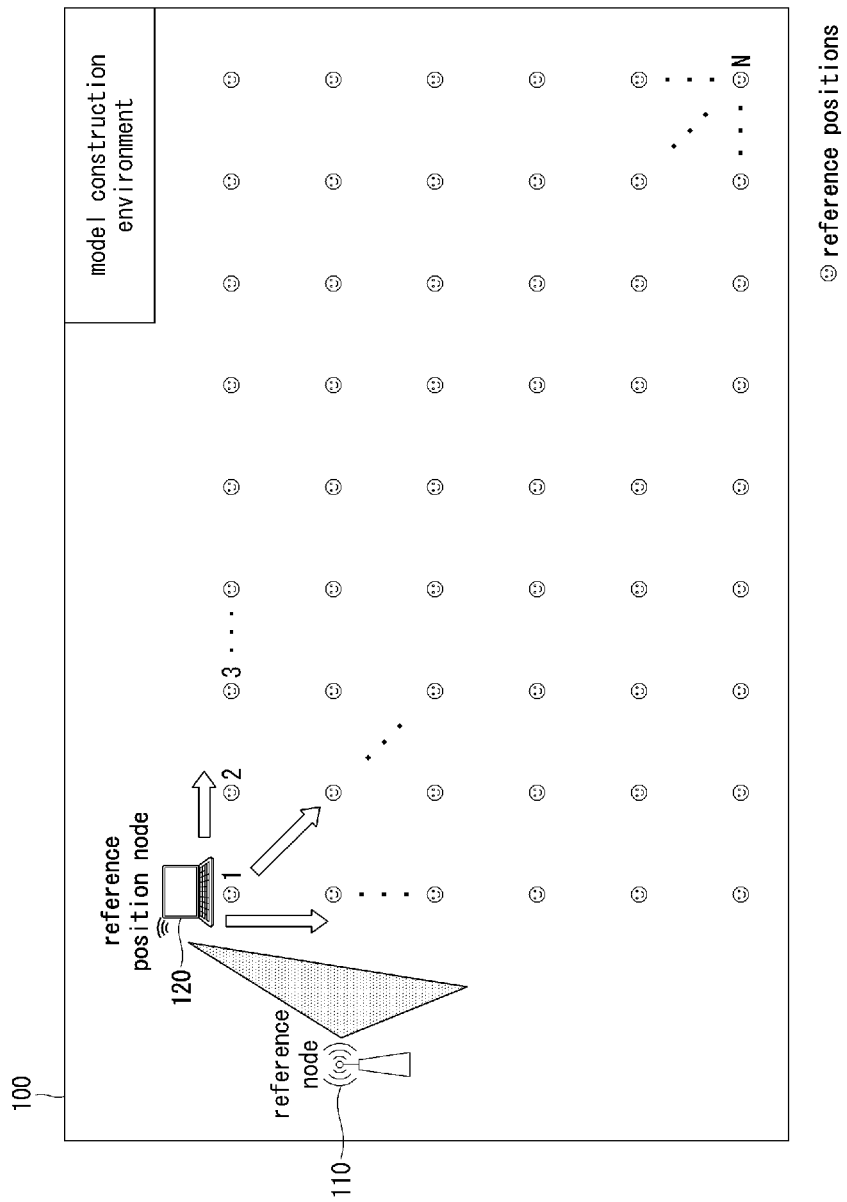
FIG. 1 is a conceptual diagram for describing a model construction environment (i.e., deployment environment) to which exemplary embodiments of the present disclosure are applied when a quasi-omnidirectional beam is assumed.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments according to the present disclosure will be described in detail with reference to the accompanying drawings. A communication system to which exemplary embodiments according to the present disclosure are applied will be described. However, a communication system to which exemplary embodiments according to the present disclosure are applied is not limited to the contents described below, and exemplary embodiments according to the present disclosure may be applied to various communication systems. Here, a communication system may be used in the same sense as a communication network.

As an apparatus or infrastructure for accommodating positioning methods according to exemplary embodiments of the present disclosure, a digital, analog, and/or analog-digital hybrid antenna for generating directional beams covering a target space, a quasi-omnidirectional antenna, trainable learning models, a system chip capable of performing communications through transmission and reception of data/control/positioning signals, cameras, image analyzers, radars, and/or the like may be included. All or part of the above-described devices may be mounted on a 'reference node' and/or a 'reference position node' of the exemplary embodiments to be described below. In addition, in order to help understanding before describing positioning schemes, in which a directional beam learning-based positioning and image/radar/mathematical algorithm-based positioning are combined or selectively applied, proposed by exemplary embodiments of the present disclosure, first, a quasi-omnidirectional learning-based positioning method will be described. Moreover, in exemplary embodiments of the present disclosure, methods will be mainly described based on downlink (transmission from a reference node to a reference position node), but the methods are not limited thereto. That is, the methods described based on downlink may also be applied to uplink (transmission from a reference position node to a reference node).

Quasi-Omnidirectional Beam Fingerprint Learning-Based Positioning Method

Hereinafter, a quasi-omnidirectional fingerprint learning-based positioning method proposed by the present disclosure will be described with reference to FIGS. 1 to 6.

FIG. 1 is a conceptual diagram for describing a model construction environment (i.e., deployment environment) to which exemplary embodiments of the present disclosure are applied when a quasi-omnidirectional beam is assumed.

Referring to FIG. 1, when a target space 100 is given, a plurality of reference positions (i.e., different coordinates) may be configured in the given target space 100, and a reference node 110 may be assumed to transmit signals by using a quasi-omnidirectional antenna system.

In a first step, a learning model for each reference position may be generated through learning in the model construction environment. In detail, as shown in FIG. 1, the reference node 110 may transmit a signal for positioning (i.e., positioning signal) through a quasi-omnidirectional beam covering the target space 100. In this case, the reference position node 110 may perform learning while moving to reference positions (e.g., n=1, 2, . . . , N) to generate the learning model for each reference position (hereinafter, 'reference position learning model'). In addition, reference position nodes respectively located in the plurality of reference positions in FIG. 1 may generate the reference position learning models by performing measurements on the positioning signal. Further, although an exemplary embodiment in which N reference positions are arranged at equal intervals in two dimensions is shown in FIG. 1, exemplary embodiments of the present disclosure are not limited thereto. For example, the number of reference positions may vary according to positioning accuracy requirements, etc., and the reference positions may be arranged at equal intervals or at different intervals in one dimension, two dimensions, or three dimensions. In addition, the reference positions may be arbitrarily determined by a reference position node(s), and reference position learning models may be generated by measuring the positioning signal for each of the reference positions determined in such the manner.

Figure 2:
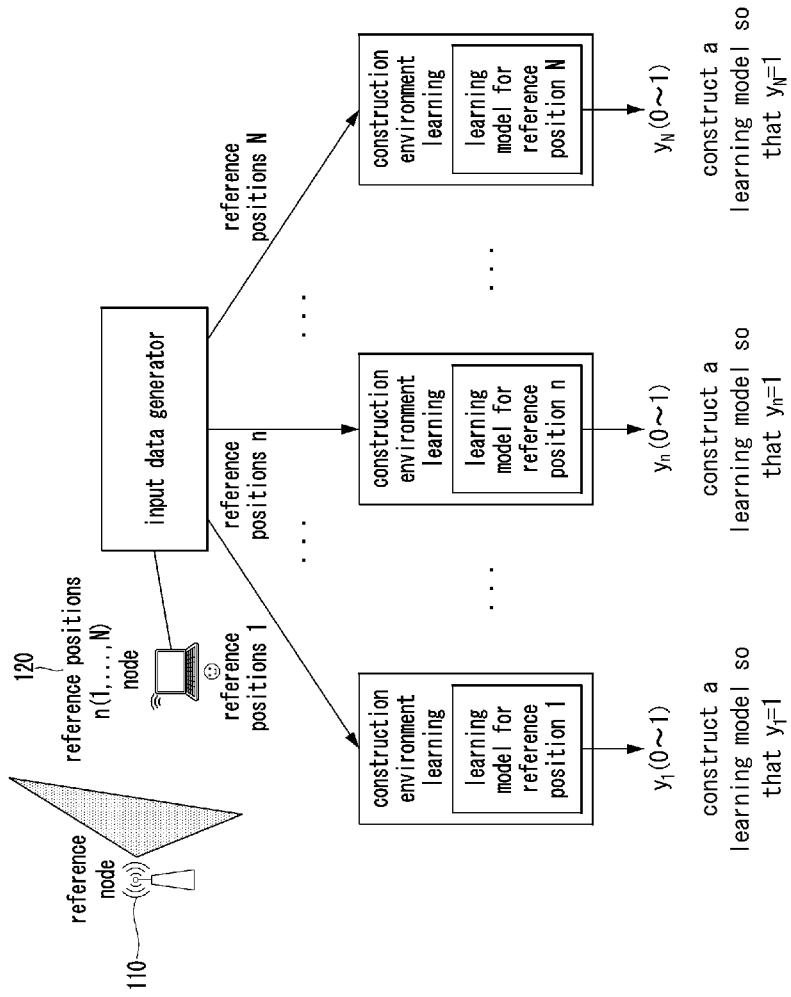
FIG. 2 is a conceptual diagram illustrating a process of generating a learning model for each reference position in the model construction environment of FIG. 1.

FIG. 2 is a conceptual diagram illustrating a process of generating a learning model for each reference position in the model construction environment of FIG. 1.

Referring to FIG. 2, the reference position node 120 may generate a learning model at a reference position n (e.g., n=1, 2, . . . , N). The reference position node 120 may receive a positioning signal transmitted by the reference node 110 through a quasi-omnidirectional beam at the reference position n (e.g., n=1, 2, . . . , N). On the other hand, one node that performs measurements while moving from position to position may serve as the reference position node 120. Alternatively, a plurality of reference position nodes each of which is located at each reference position may exist. Hereinafter, it may be described that the reference position node 120 exists as one moving node, or it may be described that there are a plurality of reference position nodes located at the respective reference positions.

Then, the reference position node 120 may measure information such as a received signal strength (RSS), channel state Information (CSI), modified CSI, a channel impulse response (CIR), and/or a magnetic field based on the received signal, and based on the measured information, may generate input data of a learning model based on deep learning (or machine learning in a broad sense) for the reference position n.

The input data (i.e., information measured for the respective reference positions) may be collected for various time zones, various seasons, and/or various human-thing environment change scenarios of the target space. As described above, the input data for various time zones, seasons, and/or scenarios may be collected to ensure objectivity and availability of the positioning.

Then, the reference position learning model may be generated by performing learning such that an output $y_n$ of the learning model of the reference position n becomes 1. The generated reference position learning models may be transmitted to a central node (not shown). Alternatively, the reference position node 120 may transmit, to the central node, the information (i.e., input data) on the RSS, CSI, modified CSI, CIR, and/or magnetic field measured with respect to the received signal.

Here, the central node may be a node that serves as a positioning server that manages the reference position learning models, and the reference node 110 described above may perform the role of the central node. However, this is only an example, and exemplary embodiments of the present disclosure are not limited thereto. For example, the central node may be a base station, one of various network entities existing in a core network, or a server existing outside. Meanwhile, the generated reference positioning learning models may be preferably managed by the central node, but may be managed at the respective reference position (i.e., by the reference position nodes of the respective reference positions).

In a second step, the generated learning models may be applied to a real environment to perform positioning, and the learning models may be updated periodically or in an event-driven manner.

Figure 3:
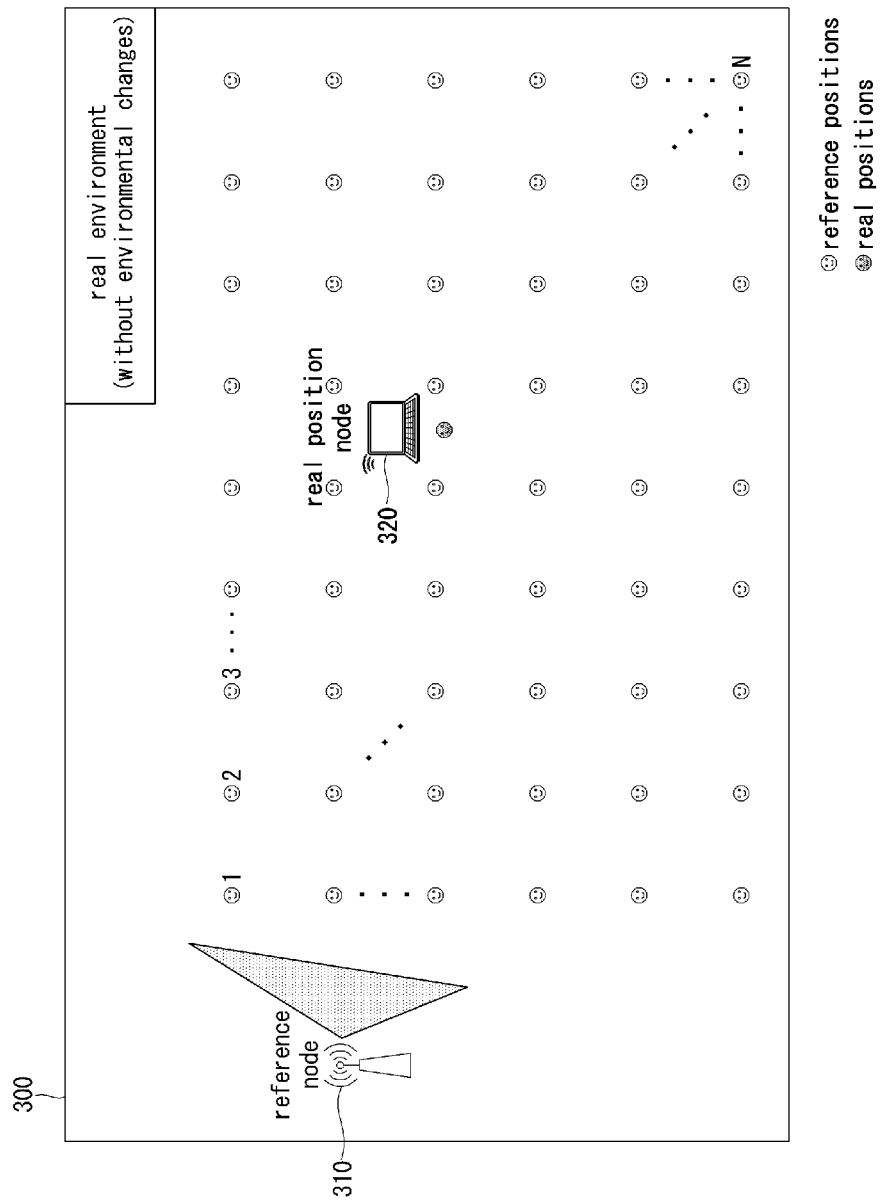
FIG. 3 is a conceptual diagram for describing an exemplary embodiment of a real environment in which positioning is performed by applying the generated learning models for the respective reference positions.

FIG. 3 is a conceptual diagram for describing an exemplary embodiment of a real environment in which positioning is performed by applying the generated learning models for the respective reference positions.

Referring to FIG. 3, a real environment without environmental changes may be assumed. A real position node 320 (hereinafter, 'measurement (or, positioning) target node' or 'communication node') whose position is to be identified may measure an RSS, CSI, modified CSI, CIR, and/or magnetic field for a positioning signal transmitted from a reference node 310 at a point where the real position node is currently located. In the real environment of FIG. 3, the reference node 310 may transmit the positioning signal through a quasi-omnidirectional beam covering a target space, and the measurement target node 320 may receive the positioning signal.

Figure 4:
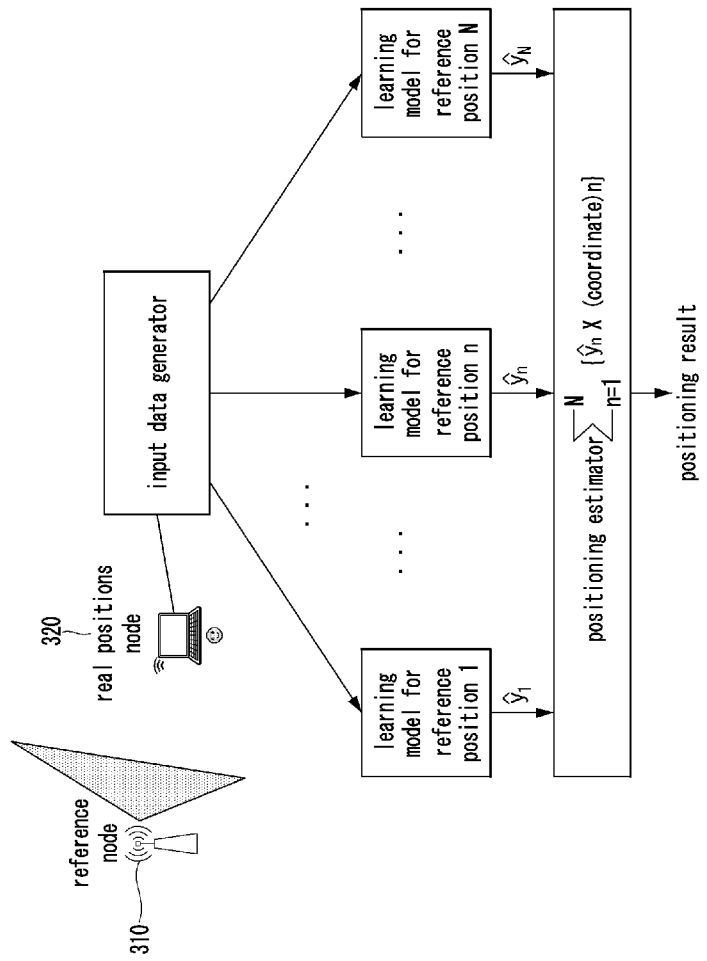
FIG. 4 is a conceptual diagram for describing an exemplary embodiment of a method of performing positioning by applying the generated learning models for the respective reference positions to the real environment of FIG. 3.

FIG. 4 is a conceptual diagram for describing an exemplary embodiment of a method of performing positioning by applying the generated learning models for the respective reference positions to the real environment of FIG. 3.

Referring to FIG. 4, the measurement target node 320 may generated input data of the learning model described with reference to FIG. 2 based on the information (e.g., RSS, CSI, modified CSI, CIR, and/or magnetic field) measured for the positioning signal transmitted through the quasi-omnidirectional beam by the reference node 310. Then, the measurement target node 320 may transmit the generated input data to the above-described central node (not shown). The central node may generate output values $\hat{y}_n$ (n=1, 2, . . . , N) of the learning models by inputting the received input data of the measurement target node 320 to the learning models of the reference positions 1 to N. Then, the central node may input the output values of the learning models to a positioning estimator. As shown in Equation 1 below, multiplication between the coordinates of the reference positions and the output values of the learning models of the reference positions are performed for all the reference positions, and all the result values of the multiplication may be summed to estimate a position (e.g., coordinate) of the measurement target node 320.

$$\text{Position(e.g.,coordinate) of real position node} = \Sigma_{n=1}^{N}\{\hat{y}_n \times (\text{coordinate})_n\}$$

On the other hand, although it is assumed in FIG. 3 that there is no environmental changes, in reality, unlike the model construction environment, the temperature may unexpectedly change or the environment changes due to people/things not considered in the model construction environment may occur.

Figure 5:
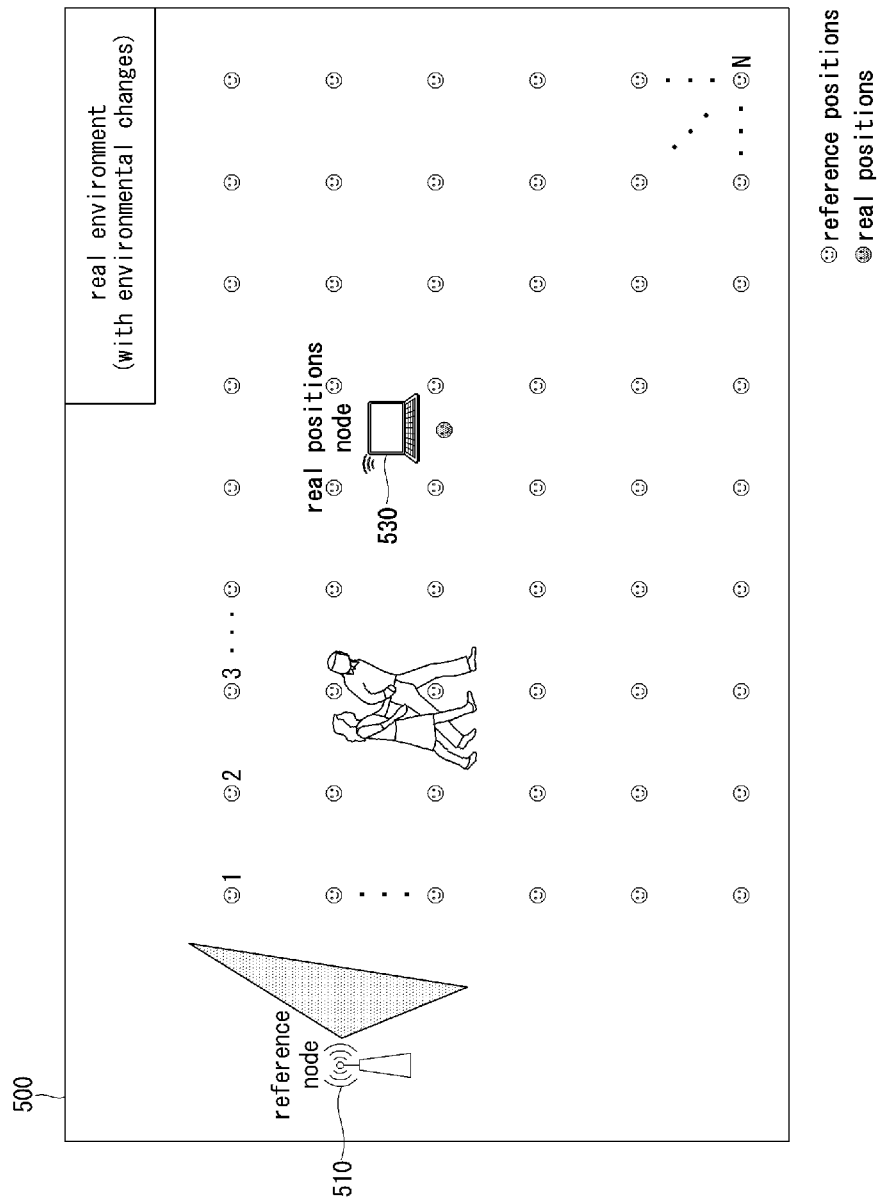
FIG. 5 is a conceptual diagram for describing another exemplary embodiment of a real environment in which positioning is performed by applying the generated learning models for the respective reference positions.

FIG. 5 is a conceptual diagram for describing another exemplary embodiment of a real environment in which positioning is performed by applying the generated learning models for the respective reference positions.

Referring to FIG. 5, a real environment with environmental changes may be assumed. As shown in FIG. 5, even when an environmental change between a reference node 510 and a real position node 530 (i.e., measurement target node or communication node) occurs only in a specific direction, since the reference node 510 transmits a positioning signal through a quasi-omnidirectional beam, input data derived from the signal received at the measurement target node 530 may have a low correlation with input data used in the model construction environment due to the influence of the environmental change. Accordingly, if the positioning process described with reference to FIG. 4 is directly applied to the real environment with the environmental changes as shown in FIG. 5, the accuracy of the estimated position may be lowered.

Hereinafter, a process of updating the learning models periodically or in an event-based manner in the real environment assuming the scenarios of FIGS. 3 and 5 will be described with reference to FIG. 6.

Figure 6:
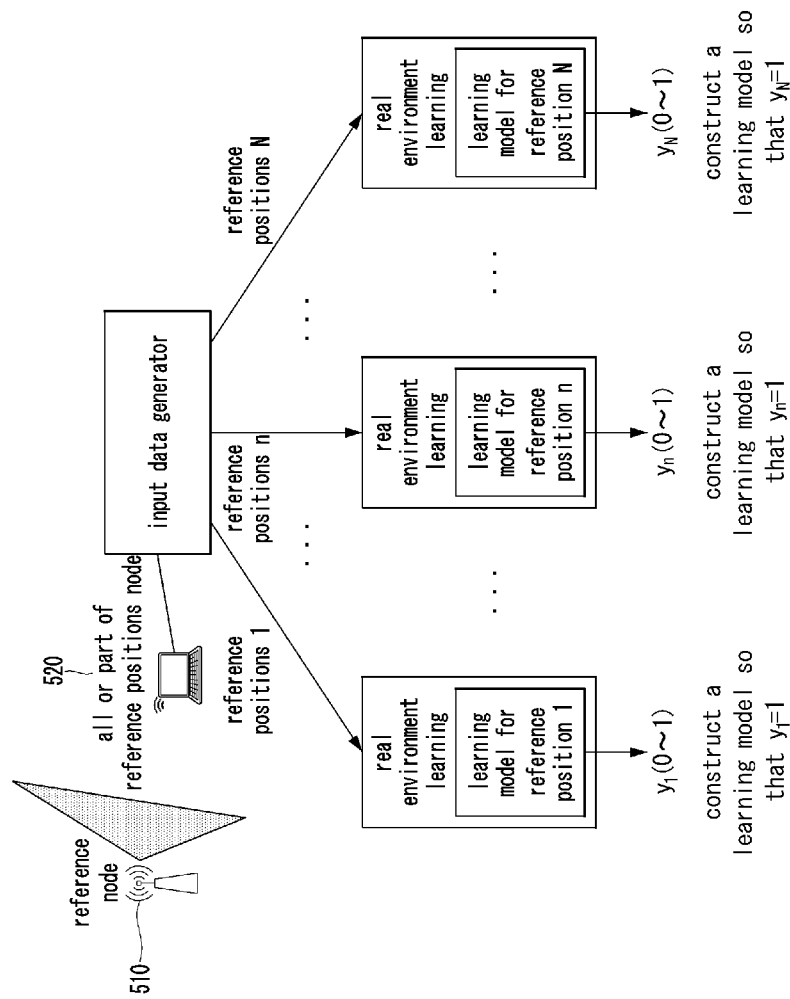
FIG. 6 is a conceptual diagram for describing an exemplary embodiment of a method of performing positioning by applying the generated learning models for the respective reference positions to the real environment of FIG. 5.

FIG. 6 is a conceptual diagram for describing an exemplary embodiment of a method of performing positioning by applying the generated learning models for the respective reference positions to the real environment of FIG. 5.

Referring to FIG. 6, the reference position node 520 may receive a positioning signal transmitted by the reference node 510 through a quasi-omnidirectional beam. All or part of the reference position nodes may each generate input data of the learning model described with reference to FIG. 2 based on the signal transmitted from the reference node 510. The generated input data may be collected by the central node described above. The central node may update the learning models periodically or in an event-based manner by performing learning such that each of the outputs of the learning models of part or all of the reference positions n(n=1, 2, . . . , N) becomes 1. Therefore, the learning models managed by the central node may reflect the real environment because the learning models are updated periodically or in an event-based manner.

In this case, at least one of all possible types of algorithms may be used as the learning model algorithm applied to the update. Meanwhile, the learning model generated in the model construction environment (i.e., the learning models described with reference to FIG. 2) may be used as they are without performing update of the learning models in the real environment as described above.

Although one reference node is assumed as an example in FIGS. 1 to 6, the methods of the present disclosure may be extended and applied even when two or more reference nodes are disposed in the target space of positioning. For example, the 2-step fingerprint learning-based positioning method based on a quasi-omnidirectional beam according to the present disclosure may be applied in a state where it is assumed that positioning signals transmitted by two or more reference nodes may overlap, may partially overlap, or may not overlap in time, frequency, and time/frequency resources.

In addition, the algorithm of the learning models, the algorithm used for updating the learning models in the real environment, and the algorithm of the positioning estimator, which are described with reference to FIGS. 2, 4, and 6, are for convenience of description, and various exemplary embodiments of the present disclosure are not limited thereto. That is, all possible algorithms may be included in the scope of the present disclosure.

In addition, the role of the learning models underlying the algorithm of the learning models, the algorithm used for updating the learning models in the real environment, and the algorithm of the positioning estimator, which are described with reference to FIGS. 2, 4, and 6, may be performed by a database (DB) of the above-mentioned input data. That is, the positioning estimator may estimate the position of the reference position node by applying at least one of possible probabilistic algorithms to the database of the input data.

Directional Beam Fingerprint Learning-Based Positioning Method

So far, the quasi-omnidirectional beam fingerprint learning-based positioning methods have been described. Hereinafter, directional beam fingerprint learning-based positioning methods will be described with reference to FIGS. 7 to 11. According to a directional beam fingerprint learning-based positioning method, a learning model may be generated for each beam in a model construction environment, beam(s) less affected by an environmental change in a real environment may be selected, and positioning may be performed based thereon, so that performance degradation due to the environmental change may be overcome.

Figure 7:
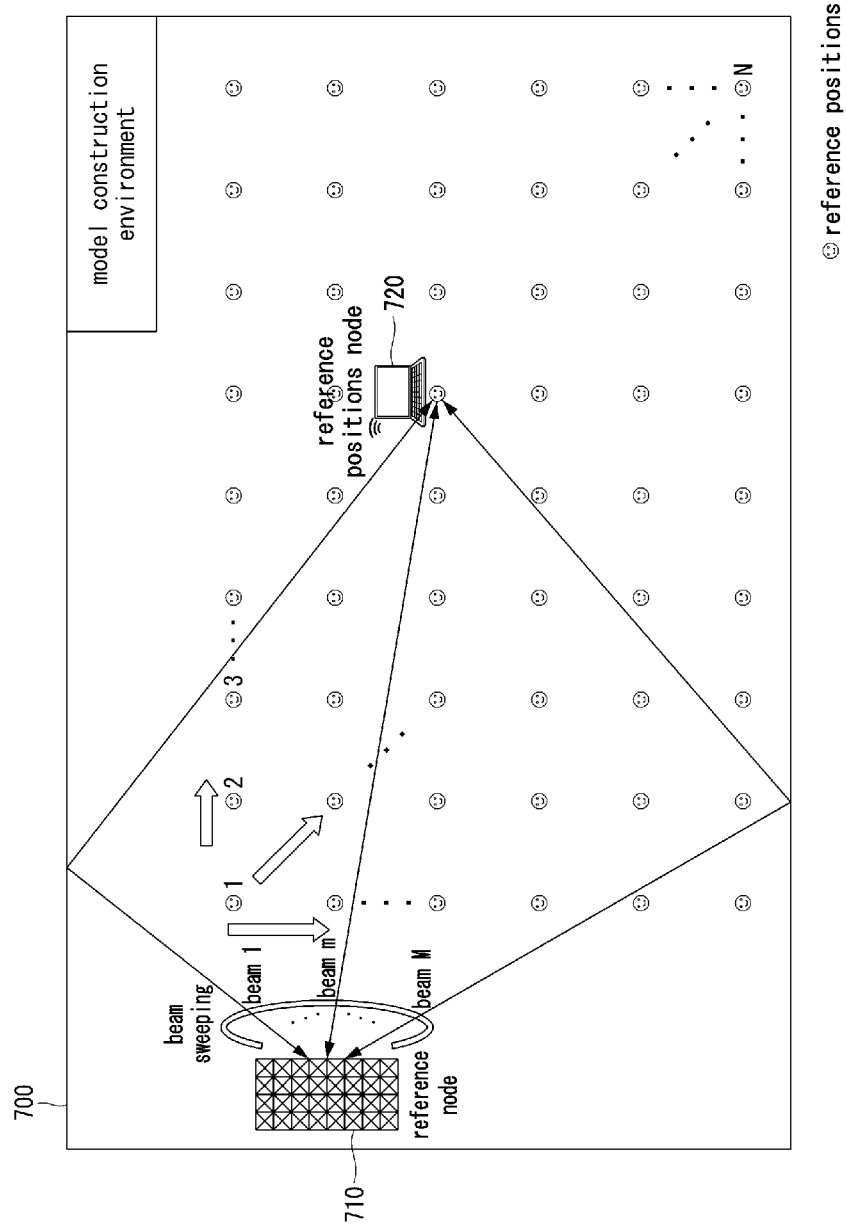
FIG. 7 is a conceptual diagram for describing a model construction environment to which exemplary embodiments of the present disclosure are applied when directional beams are assumed.

FIG. 7 is a conceptual diagram for describing a model construction environment to which exemplary embodiments of the present disclosure are applied when directional beams are assumed.

Referring to FIG. 7, when a target space 700 is given, a plurality of reference positions (i.e., different coordinates) may be configured in the given target space 700, and a reference node 710 may be assumed to transmit signals by using a directional antenna system. For example, it may be assumed that the reference node 710 transmits signals through beamforming by using an array antenna system capable of generating directional beams.

In a first step, a learning model for each beam and each reference position (hereinafter, 'beam/reference position learning model') may be generated through learning in the model construction environment. In detail, as shown in FIG. 7, the reference node 710 may transmit positioning signals through directional beams $beam_1, \ldots, beam_m, \ldots,$ and $beam_M$ covering the target space 700. That is, the reference node 710 may transmit the positioning signals through the directional beams $beam_1, \ldots, beam_m, \ldots, beam_M$ while performing beam sweeping, and a reference position node 720 may perform learning while moving to the reference positions (e.g., n=1, 2, . . . , N) for each beam to generate the beam/reference position learning models. Alternatively, reference position nodes located in the respective reference positions in FIG. 7 may generate the beam/reference position learning models by performing measurements on the positioning signals. Further, an exemplary embodiment in which N reference positions are arranged at equal intervals in two dimensions is shown in FIG. 7, exemplary embodiments of the present disclosure are not limited thereto. For example, the number of reference positions may vary according to positioning accuracy requirements, etc., and the reference positions may be arranged at equal intervals or at different intervals in one dimension, two dimensions, or three dimensions. In addition, the reference positions may be arbitrarily determined by a reference position node(s), and reference position learning models may be generated by measuring the positioning signal for each of the reference positions determined in such the manner.

Figure 8:
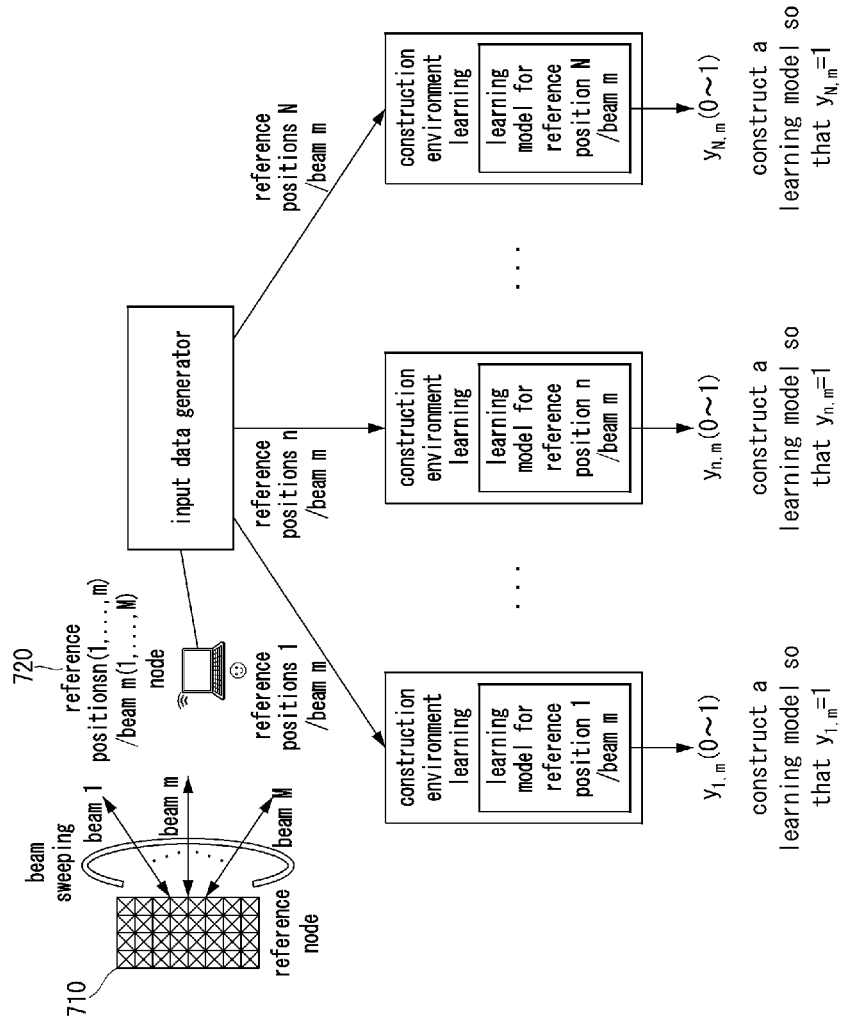
FIG. 8 is a conceptual diagram illustrating a process of generating a learning model for each reference position and each beam in the model construction environment of FIG. 7.

FIG. 8 is a conceptual diagram illustrating a process of generating a learning model for each reference position and each beam in the model construction environment of FIG. 7.

Referring to FIG. 8, the reference position node 720 may generate a learning model for the directional beam $beam_m$ of the reference node 710 at the reference position n (n=1, 2, ..., N). The reference position node 720 may receive the positioning signal transmitted by the reference node 710 through the directional beam $beam_m$ at the reference position n(n=1, 2, ..., N). On the other hand, one node that performs measurements while moving from position to position may serve as the reference position node 720. Alternatively, a plurality of reference position nodes each of which is located at each reference position may exist. Hereinafter, it may be described that the reference position node 720 exists as one moving node, or it may be described that there are a plurality of reference position nodes located at the respective reference positions.

Then, the reference position node 720 may measure information such as an RSS, CSI, modified CSI, channel impulse response (CIR), and/or magnetic field based on the received signal, and based on the measured information, may generate input data of a learning model based on deep learning (or machine learning in a broad sense) for and the directional beam $beam_m$ and the reference position n.

The input data (i.e., information measured for the respective reference positions) may be collected for various time zones, various seasons, and various human-thing environment change scenarios of the target space. As described above, the input data for various time zones, seasons, and scenarios may be collected to ensure objectivity and availability of the positioning.

Then, the beam/reference position learning model may be generated by performing learning such that an output $y_{n,m}$ of the learning model of the directional beam $beam_m$ and the reference position n becomes 1. The generated beam/reference position learning models may be transmitted to the central node (not shown). Alternatively, the reference position node 720 may transmit, to the central node, the information (i.e., input data) on the RSS, CSI, modified CSI, CIR, and/or magnetic field measured with respect to the received signal.

Here, the central node may be a node that serves as a positioning server that manages the reference position learning models, and the reference node 710 described above may perform the role of the central node. However, this is only an example, and exemplary embodiments of the present disclosure are not limited thereto. For example, the central node may be a base station, one of various network entities existing in a core network, or a server existing outside. Meanwhile, the generated reference positioning learning models may be preferably managed by the central node, but may be managed at the respective reference position (i.e., by the reference position nodes of the respective reference positions).

In a second step, the generated learning models may be applied to a real environment to perform positioning, and the learning models may be updated periodically or in an event-driven manner.

Figure 9:
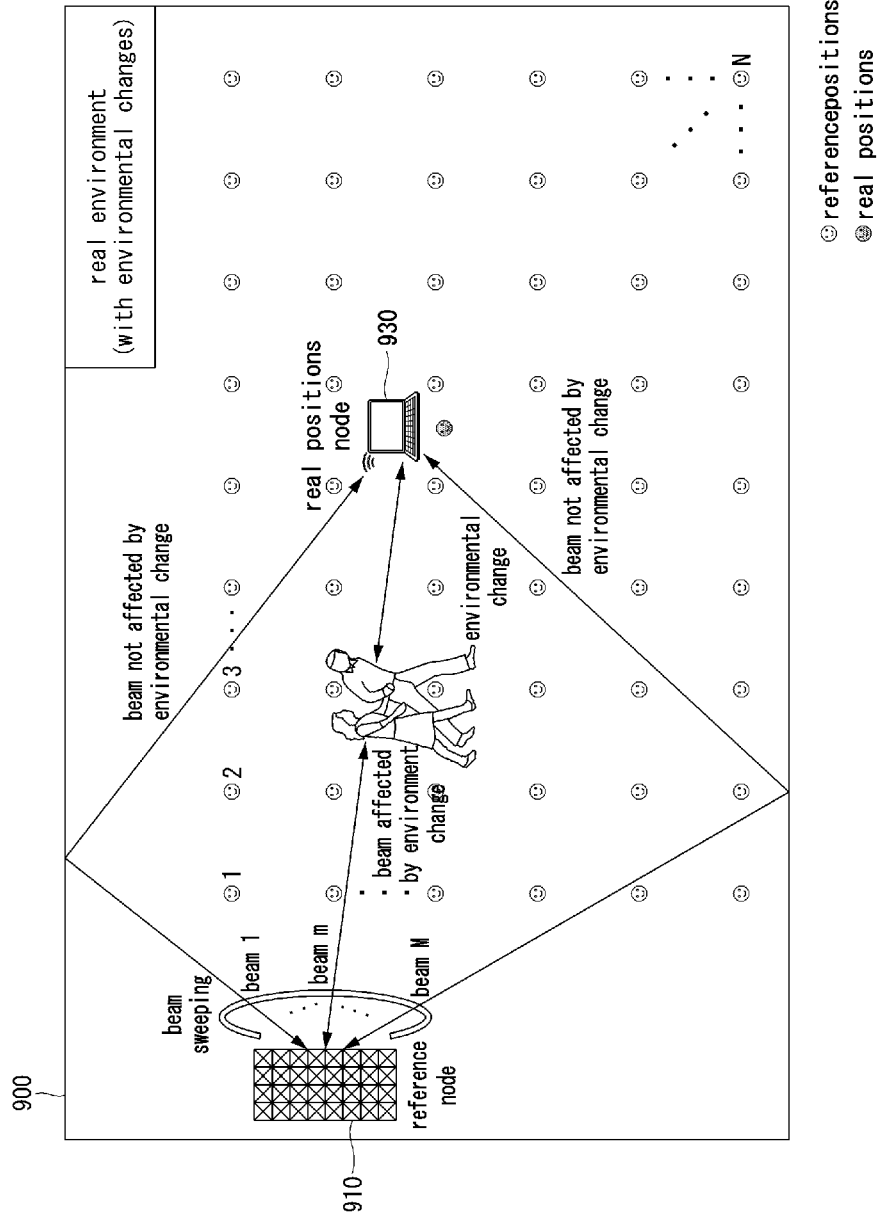
FIG. 9 is a conceptual diagram for describing an exemplary embodiment of a real environment in which positioning is performed by applying the generated learning models for the respective beams and reference positions.

FIG. 9 is a conceptual diagram for describing an exemplary embodiment of a real environment in which positioning is performed by applying the generated learning models for the respective beams and reference positions.

Referring to FIG. 9, a real environment with environmental changes may be assumed. As shown in FIG. 9, even when an environmental change between a reference node 910 and a real position node 930 (measurement target node or communication node), among the plurality of directional beams $beam_1, \ldots, beam_m, \ldots, beam_M$ transmitted by the reference node 910, there may be beam(s) that are affected and beam(s) that are not affected by the environmental change. Accordingly, in exemplary embodiments of the present disclosure, learning models for the beam(s) that are not affected by or least affected by the environmental change among the plurality of directional beams $beam_1, \ldots, beam_m, \ldots, beam_M$ may be selectively applied to increase the accuracy of positioning.

Figure 10:
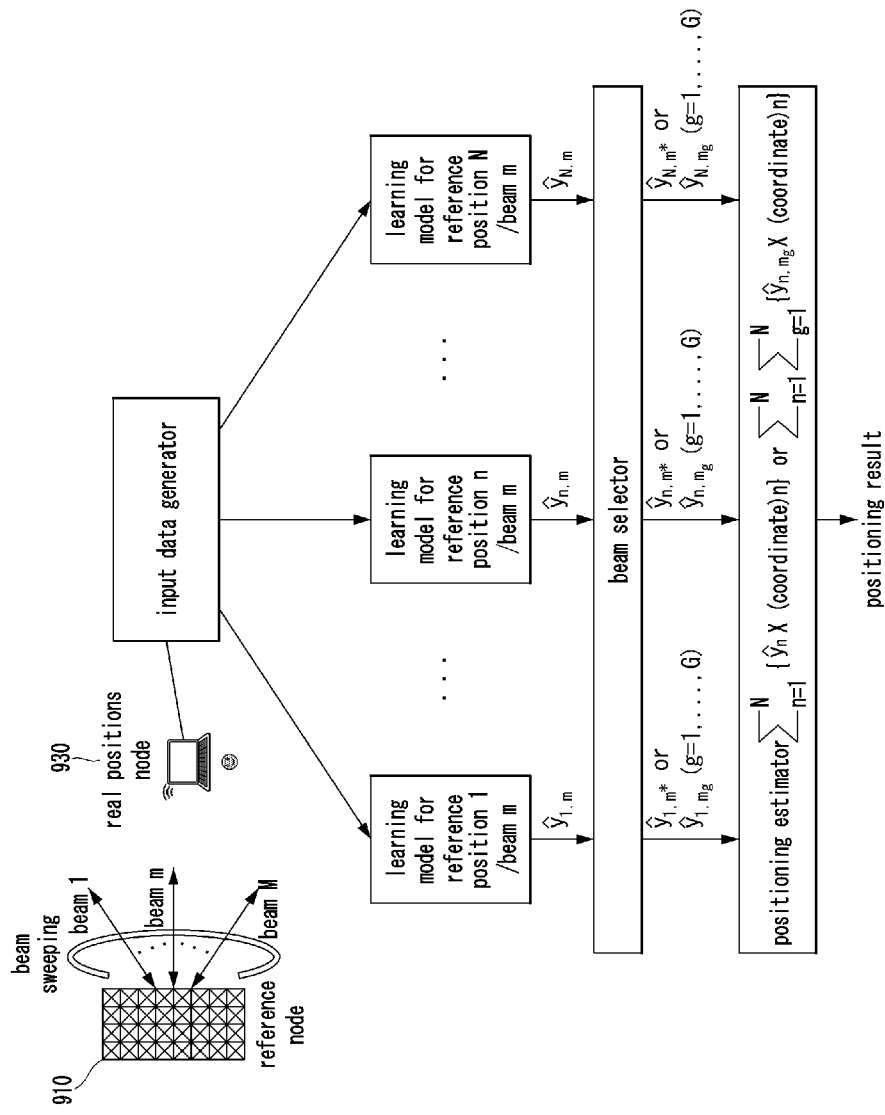
FIG. 10 is a conceptual diagram for describing an exemplary embodiment of a method of performing positioning by applying the generated learning models for the respective beams and reference positions to the real environment of FIG. 9.

FIG. 10 is a conceptual diagram for describing an exemplary embodiment of a method of performing positioning by applying the generated learning models for the respective beams and reference positions to the real environment of FIG. 9.

Referring to FIG. 10, the real position node 930 (i.e., measurement target node or communication node) may generate input data of a learning model (hereinafter, 'beam/reference position learning model') for each beam and each reference position based on information (e.g., RSS, CSI, modified CSI, CIR, and/or magnetic field) measured for each of the positioning signals transmitted in the beam sweeping scheme by the reference node 910 through the directional beams $beam_1, \ldots, beam_m, \ldots,$ and $beam_M$. The measurement target node 930 may transmit the generated input data to the above-described central node (not shown). The central node may input the received input data of the measurement target node 930 to the learning models of the reference positions 1 to N of the directional beam $beam_M$, thereby generating output values $\hat{y}_{n,m}$ (n=1, ..., N, m=1, ..., M) of the beam/reference position learning models. Then, the central node may input the output values of the learning models to a beam selector, and select a single beam or a plurality of beams that are not affected by or are least affected by the environmental change based on one of the following schemes.

<Scheme 1> The central node may select one directional beam m* by Equation 2 below, and transmit the output values $\hat{y}_{n,m^*}$ of the learning models for the reference positions with respect to the selected beam to a positioning estimator.

$$\text{Selected beam index: } m^* = \arg\max_{m=1,\ldots,M} \left\{ \sum_{n=1}^{N} \hat{y}_{n,m} \right\} \quad \text{[Equation 2]}$$

Output values of learning models for selected beam: $\hat{y}_{n,m^*}$

<Scheme 2> The central node may select a group of beams $m_g$ by Equation 3 below, and transmit the output values $\hat{y}_{n,m_g}$ (n=1, ..., N, g=1, ..., G) of the learning models for the reference positions for the selected beams to the positioning estimator.

Selected multiple beam indexes: $m_g(g=1, \ldots, G)$:
  indexes of $G$ beams having the largest
  $\{\sum_{n=1}^{N} \hat{y}_{n,m}\}$  [Equation 3]

Output values of learning models for selected beams: $\hat{y}_{n,m_g}$

<Scheme 3> Various schemes for selecting a single beam or a plurality of beams that are least affected by the environmental change, different from those of <Scheme 1> and <Scheme 2>, may be applied.

Then, the central node may input the output values (i.e., $\hat{y}_{n,m^*}=1, N$) or $\hat{y}_{n,m_g}$ (n=1, ..., N, g=1, ..., G)) of the learning models to the positioning estimator. As shown in Equation 4 below, with respect to the selected directional beam(s), multiplication between the coordinates of the reference positions and the output values of the learning models of the reference positions are performed for all the reference positions, and all the result values of the multiplication may be summed to estimate a position (e.g., coordinate) of the measurement target node 920.

Position(e.g., coordinate) of real position
  node=$\sum_{n=1}^{N} \{\hat{y}_{n,m^*} \times (\text{coordinate})_n\}$ or
  $\sum_{n=1}^{N} \sum_{g=1}^{G} \{\hat{y}_{n,m_g} \times (\text{coordinate})_n\}$  [Equation 4]

Hereinafter, a process of updating the learning models periodically or in an event-based manner in the real environment assuming the scenario of FIG. 9 will be described with reference to FIG. 11.

Figure 11:
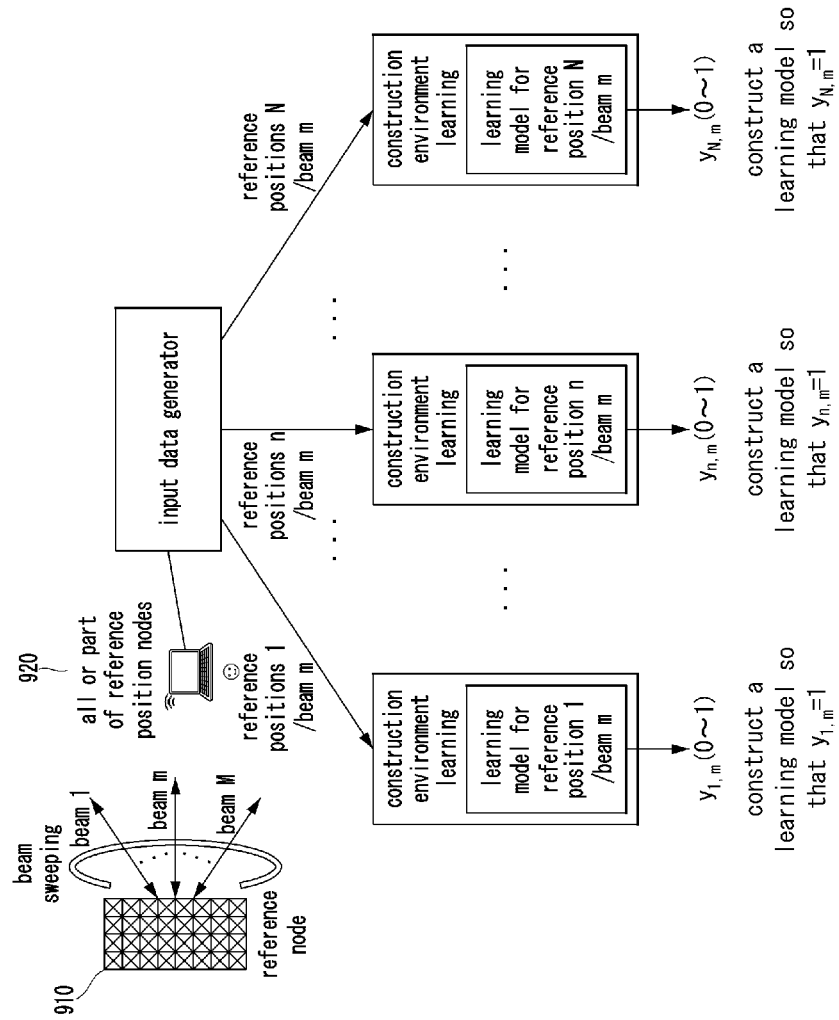
FIG. 11 is a conceptual diagram for describing another exemplary embodiment of a method of performing positioning by applying the generated learning models for the respective beams and reference positions to the real environment of FIG. 9.

FIG. 11 is a conceptual diagram for describing another exemplary embodiment of a method of performing positioning by applying the generated learning models for the respective beams and reference positions to the real environment of FIG. 9.

Referring to FIG. 11, the reference position node 920 may receive the positioning signals transmitted by the reference node 910 through the directional beams beam$_1$, ..., beam$_m$, ..., and beam$_M$ in the beam sweeping scheme. All or part of the reference position nodes may each generate input data of the learning models described with reference to FIG. 10 based on the signals transmitted from the reference node 910. The generated input data may be collected by the central node described above. The central node may update the learning models for each beam and reference position periodically or in an event-based manner by performing learning such that the outputs $y_{n,m}$ of the learning models of all or part of the reference positions n(n=1, 2, ..., N) for the directional beam$_M$ becomes 1. Therefore, since the learning models are updated periodically or in an event-based manner, the learning models managed by the central node may more accurately reflect the real environment.

In this case, at least one of all possible types of algorithms may be used as the learning model algorithm applied to the update. Meanwhile, the learning model generated in the model construction environment (i.e., the learning models described with reference to FIG. 10) may be used as they are without performing update of the learning models in the real environment as described above.

Although one reference node is assumed as an example in FIGS. 7 to 11, the methods of the present disclosure may be extended and applied even when two or more reference nodes are disposed in the target space of positioning. For example, the 2-step fingerprint learning-based positioning method based on directional beams according to the present disclosure may be applied in a state where it is assumed that positioning signals transmitted by two or more reference nodes may overlap, may partially overlap, or may not overlap in time, frequency, and time/frequency resources.

In addition, the algorithm of the learning models, the algorithm used for updating the learning models in the real environment, and the algorithm of the positioning estimator, which are described with reference to FIGS. 8, 10, and 11, are for convenience of description, and various exemplary embodiments of the present disclosure are not limited thereto. That is, all possible algorithms may be included in the scope of the present disclosure.

In addition, the role of the learning models underlying the algorithm of the learning models, the algorithm used for updating the learning models in the real environment, and the algorithm of the positioning estimator, which are described with reference to FIGS. 8, 10, and 11, may be performed by a database (DB) of the above-mentioned input data. That is, the positioning estimator may estimate the position of the reference position node by applying at least one of possible probabilistic algorithms to the database of the input data.

Selection/Combination of Beam Fingerprint Learning-Based Positioning and Image/Radar/Mathematical Positioning Hereinafter, a method of performing primary positioning using the above-described beam fingerprint learning-based positioning method and secondary positioning based on image/radar/mathematic (e.g., angle and timing-based) algorithms, an determining a final positioning result by selecting one of the results thereof or combining the results will be described with reference to FIGS. 1 to 9 and 11 to 12.

When the target space is given as shown in FIG. 7, a plurality of reference positions (i.e., different coordinates) may be configured in the given target space, and the reference node 710 may be assumed to transmit signals by using a directional antenna system. For example, it may be assumed that the reference node 710 transmits signals through beamforming by using an array antenna system capable of generating directional beams.

In a first step, a learning model for each beam and each reference position (hereinafter, 'beam/reference position learning model') may be generated through learning in the model construction environment. In detail, as shown in FIG. 7, the reference node 710 may transmit positioning signals through directional beams beam$_1$, ..., beam$_m$, ..., and beam$_M$ covering the target space. That is, the reference node 710 may transmit the positioning signals through the directional beams beam$_1$, ..., beam$_m$, ..., beam$_M$ while performing beam sweeping, and the reference position node 720 may perform learning while moving to the reference positions (e.g., n=1, 2, ..., N) for each beam to generate the beam/reference position learning models. Alternatively, reference position nodes located in the respective reference positions in FIG. 7 may generate the beam/reference position learning models by performing measurements on the positioning signals. Further, an exemplary embodiment in which N reference positions are arranged at equal intervals in two dimensions is shown in FIG. 7, exemplary embodiments of the present disclosure are not limited thereto. For example, the number of reference positions may vary according to positioning accuracy requirements, etc., and the reference positions may be arranged at equal intervals or at different intervals in one dimension, two dimensions, or three dimensions. In addition, the reference positions may be arbitrarily determined by a reference position node(s), and reference position learning models may be generated by measuring the positioning signal for each of the reference positions determined in such the manner.

Referring to FIG. 8, the reference position node 720 may generate a learning model for the directional beam beam$_m$ of the reference node 710 at the reference position n (n=1, 2, ..., N). The reference position node 720 may receive a positioning signal transmitted by the reference node 710 through the directional beam beam$_m$ at the reference position n(n=1, 2, . . . , N). On the other hand, one node that performs measurements while moving from position to position may serve as the reference position node 720. Alternatively, a plurality of reference position nodes each of which is located at each reference position may exist. Hereinafter, it may be described that the reference position node 720 exists as one moving node, or it may be described that there are a plurality of reference position nodes located at the respective reference positions.

Then, the reference position node 720 may measure information such as an RSS, CSI, modified CSI, channel impulse response (CIR), and/or magnetic field based on the received signal, and based on the measured information, may generate input data of a learning model based on deep learning (or machine learning in a broad sense) for and the directional beam beam$_m$ and the reference position n.

The input data (i.e., information measured for the respective reference positions) may be collected for various time zones, various seasons, and/or various human-thing environment change scenarios of the target space. As described above, the input data for various time zones, seasons, and/or scenarios may be collected to ensure objectivity and availability of the positioning.

Then, the beam/reference position learning model may be generated by performing learning such that an output $y_{n,m}$ of the learning model of the directional beam beam$_m$ and the reference position n becomes 1. The generated beam/reference position learning models may be transmitted to the central node (not shown). Alternatively, the reference position node 720 may transmit, to the central node, the information (i.e., input data) on the RSS, CSI, modified CSI, CIR, and/or magnetic field measured with respect to the received signal.

Here, the central node may be a node that serves as a positioning server that manages the reference position learning models, and the reference node 710 described above may perform the role of the central node. However, this is only an example, and exemplary embodiments of the present disclosure are not limited thereto. For example, the central node may be a base station, one of various network entities existing in a core network, or a server existing outside. Meanwhile, the generated reference positioning learning models may be preferably managed by the central node, but may be managed at the respective reference position (i.e., by the reference position nodes of the respective reference positions). Also, the learning models may be updated periodically or in an event-based manner.

When the directional beam-based primary positioning result is obtained through the first step, secondary positioning based on image/radar/mathematical positioning techniques may be performed.

Figure 12:
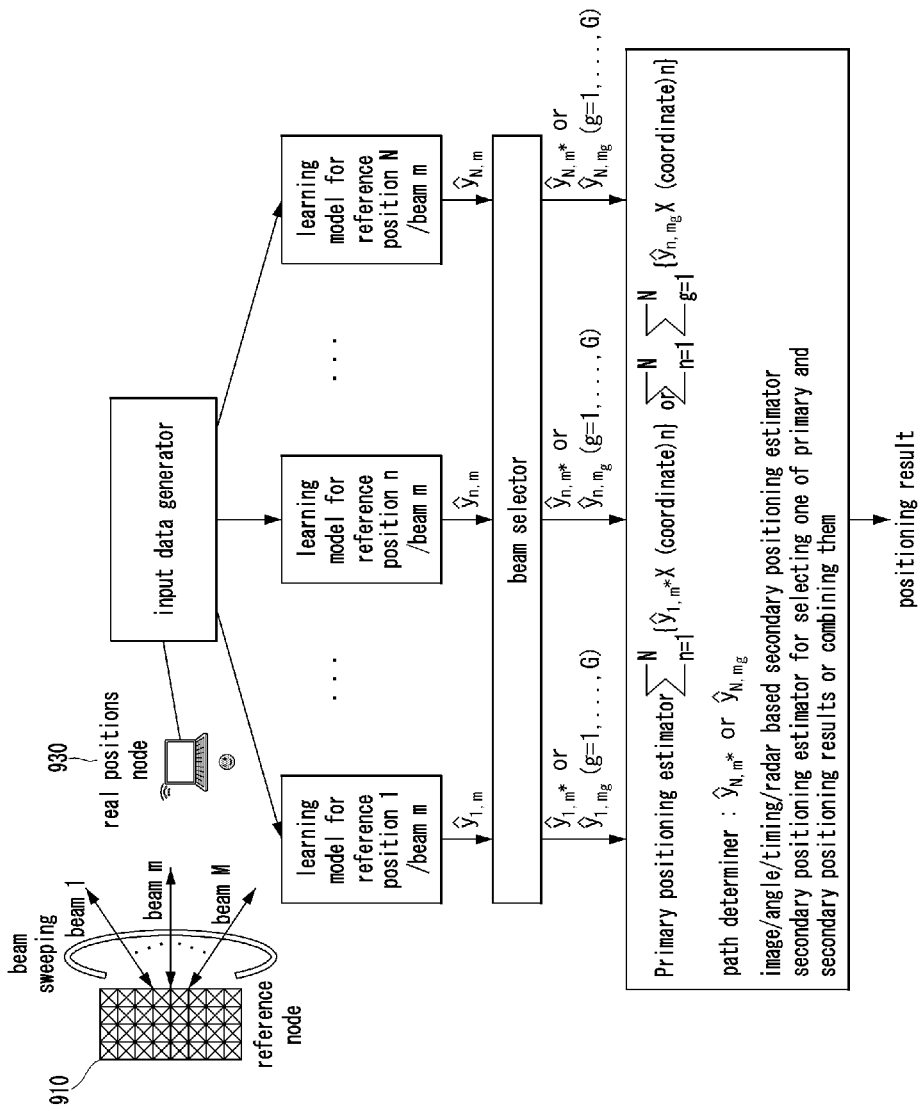
FIG. 12 is a conceptual diagram for describing an exemplary embodiment of a method for determining a final positioning result by using a primary positioning result based on a directional beam fingerprint-based positioning technique and a secondary positioning result based on an image/radar/mathematical positioning technique.

FIG. 12 is a conceptual diagram for describing an exemplary embodiment of a method for determining a final positioning result by using a primary positioning result based on a directional beam fingerprint-based positioning technique and a secondary positioning result based on an image/radar/mathematical positioning technique.

Referring to FIG. 12, the real position node 930 (i.e., measurement target node or communication node) may generate input data of a learning model (hereinafter, 'beam/reference position learning model' for each beam and each reference position based on information (e.g., RSS, CSI, modified CSI, CIR, and/or magnetic field) measured for each of the positioning signals transmitted in the beam sweeping scheme by the reference node 910 through the directional beams beam$_1$, . . . , beam$_m$, . . . , and beam$_M$. The measurement target node 930 may transmit the generated input data to the above-described central node (not shown).

The central node may input the received input data of the measurement target node 930 to the learning models of the reference positions 1 to N of the directional beam beam$_M$, thereby generating output values $\hat{y}_{n,m}$ (n=1, . . . , N, m=1, . . . , M) of the beam/reference position learning models. Then, the central node may input the output values of the learning models to a beam selector, and select a single beam or a plurality of beams that are not affected by or are least affected by the environmental change based on one of the above described Schemes 1 to 3.

Then, the central node may determine a direction and a distance of a single path or multiple paths based on the selected single beam m* or group of beams $m_g$ and the measured position of the measurement target node 930. In this case, the direction and distance may be determined by one of the following schemes.

In case of Line-of-Sight (LoS): The direction and distance may be determined based on a LOS path.

In case of Non-Line-of-Sight (NLOS): The direction and distance may be determined based on a path reflected once.

Then, the central node may perform secondary positioning (i.e., fine positioning) using at least one of the following schemes based on the determined direction and distance.

<Image-based scheme> If a path determined by the reference node disposed as shown in FIGS. 7 and 9 is a LoS path, the fine positioning may be performed using an image captured at the corresponding reference node and feature points of a 3D map. If the path determined by the reference node is an NLoS path, the fine positioning may be performed using an image captured by another camera or a reference node equipped with a camera at a position where LoS is secured and the feature points of the 3D map. In the image-based scheme, the 3D map of the target space should be secured in advance, and a camera capable of photographing the image should be mounted on the reference node, or cameras capable of photographing should be arranged in multiple positions.

<Radar-based scheme> If a path determined by the reference node disposed as shown in FIGS. 7 and 9 is a LoS path, a signal returned after the positioning signal transmitted from the reference node is reflected may be processed using a radar function of the reference node. That is, the fine positioning for the real position node may be performed by detecting the direction and distance of the real position node using the radar function. If the path determined by the reference node disposed as shown in FIGS. 7 and 9 is an NLoS path, the signal returned after the positioning signal transmitted from the reference node is reflected may be processed using a radar function of another reference node, so that the fine positioning is performed by detecting the direction and distance. In the radar-based scheme, a plurality of reference nodes should be equipped with radar functions.

<Angle-based scheme> Even if the path determined from the reference node disposed as shown in FIGS. 7 and 9 is an NLoS path, since the direction and distance of the real position node are identified, Angle of Array (AoA)-based fine positioning may be used.

Figure 13:
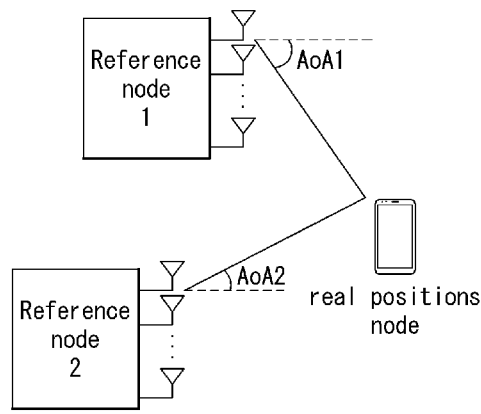
FIG. 13 is a conceptual diagram for describing an AoA-based fine positioning.

FIG. 13 is a conceptual diagram for describing an AoA-based fine positioning.

Referring to FIG. 13, a case where paths between two reference nodes and a real position node are LoS paths. However, even when the paths between the reference nodes and the real position node are NLoS paths as shown in FIG. 9, if the directions and distances between the reference nodes and the real position node are known, the AoA-based fine positioning may be performed. In the AoA-based positioning, when only 2D positioning is desired, at least two reference nodes are required, and when 3D positioning is desired, at least three or more reference nodes are required.

<Timing-based scheme> If a path determined from the reference node disposed as shown in FIGS. 7 and 9 is an NLoS path, since the direction and distance of the real position node are identified, a Time Difference of Arrival (TDoA)-based fine positioning may be used.

Figure 14:
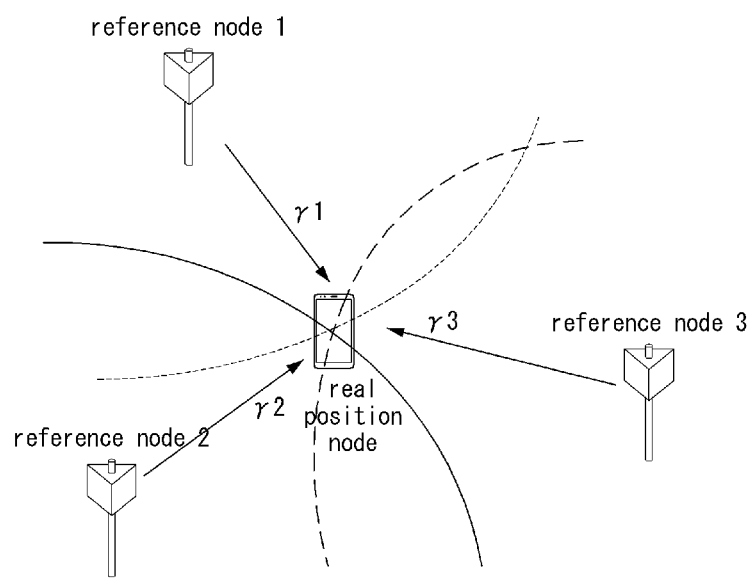
FIG. 14 is a conceptual diagram for describing a TDoA-based fine positioning.

FIG. 14 is a conceptual diagram for describing a TDoA-based fine positioning. Referring to FIG. 14, a case where paths between three reference nodes and a real position node are LoS paths. However, even when the paths between the reference nodes and the real position node are NLoS paths as shown in FIG. 9, if the directions and distances between the reference nodes and the real position node are known, the TDoA/ToA-based fine positioning may be performed. In the TDoA/ToA-based positioning, when only 2D positioning is desired, at least three or more reference nodes are required, and when 3D positioning is desired, at least four or more reference nodes are required. In addition, for the TDoA-based positioning, absolute synchronization between the reference nodes should be acquired (i.e., the reference nodes share the same time or clock regardless of distances therebetween), and for the ToA-based positioning, absolute synchronization between the reference nodes and the real position node should be acquired.

<Other schemes> All schemes for mathematically accurately measuring a position using information on the direction and distance of the determined path, which are different from the above schemes, may be included in the scope of the present disclosure.

Then, the central node may obtain the final positioning result by selecting/combining the primary positioning result and the secondary positioning result as shown below.

Selective final positioning: The central node may select the primary positioning result or the secondary positioning result as the final positioning result according to the density (i.e., the distances between the reference positions) of the reference positions applied to the primary positioning.

Conjunctive final positioning: The central node may obtain the final positioning result by performing mathematical addition by assigning weights to the primary and secondary positioning results, respectively.

The reference position node 920 may receive the positioning signals transmitted by the reference node 910 through the directional beams $beam_1, \ldots, beam_m, \ldots,$ and $beam_M$ in the beam sweeping scheme. All or part of the reference position nodes may each generate input data of the learning models described with reference to FIG. 10 based on the signals transmitted from the reference node 910. The generated input data may be collected by the central node described above. The central node may update the learning models for each beam and reference position periodically or in an event-based manner by performing learning such that the outputs $y_{n,m}$ of the learning models of all or part of the reference positions $n(n=1, 2, \ldots, N)$ for the directional $beam_M$ becomes 1. Therefore, since the learning models are updated periodically or in an event-based manner, the learning models managed by the central node may more accurately reflect the real environment.

In this case, at least one of all possible types of algorithms may be used as the learning model algorithm applied to the update. Meanwhile, the learning model generated in the model construction environment (i.e., the learning models described with reference to FIG. 7) may be used as they are without performing update of the learning models in the real environment as described above.

Although one reference node is assumed as an example in FIGS. 7 to 11, the methods of the present disclosure may be extended and applied even when two or more reference nodes are disposed in the target space of positioning. For example, the 2-step fingerprint learning-based positioning method based on directional beams according to the present disclosure may be applied in a state where it is assumed that positioning signals transmitted by two or more reference nodes may overlap, may partially overlap, or may not overlap in time, frequency, and time/frequency resources.

In addition, the algorithm of the learning models, the algorithm used for updating the learning models in the real environment, and the algorithm of the positioning estimator, which are described with reference to FIGS. 8, 10, and 12, are for convenience of description, and various exemplary embodiments of the present disclosure are not limited thereto. That is, all possible algorithms may be included in the scope of the present disclosure.

In addition, the role of the learning models underlying the algorithm of the learning models, the algorithm used for updating the learning models in the real environment, and the algorithm of the positioning estimator, which are described with reference to FIGS. 8, 10, and 12, may be performed by a database (DB) of the above-mentioned input data. That is, the positioning estimator may estimate the position of the reference position node by applying at least one of possible probabilistic algorithms to the database of the input data.

In addition, various exemplary embodiments of the selection/combination method between the directional beam fingerprint-based positioning result and the image/radar/mathematical algorithm-based positioning result may be applied.

Figure 15:
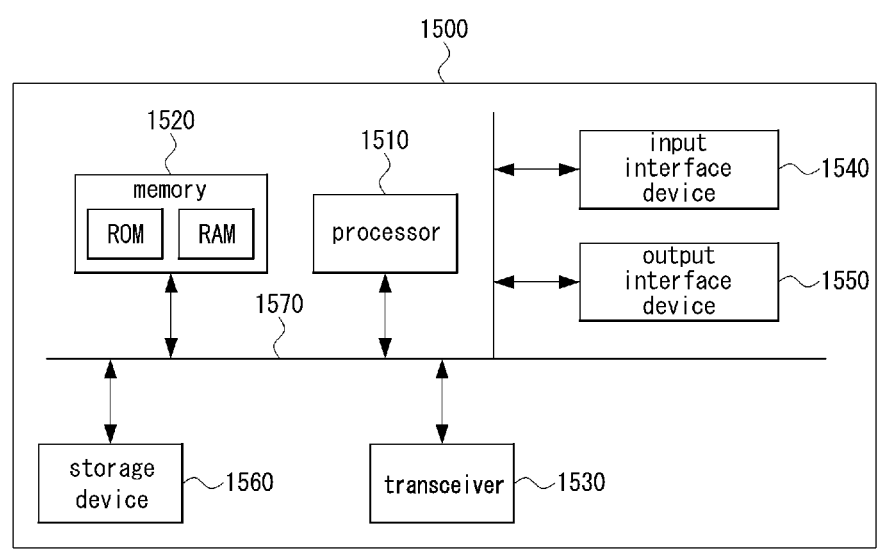
FIG. 15 is a block diagram illustrating a configuration of a communication node according to exemplary embodiments of the present disclosure.

FIG. 15 is a block diagram illustrating a configuration of a communication node according to exemplary embodiments of the present disclosure.

A communication node described with reference to FIG. 15 may be one of the reference node, reference position node, real position node, and central node, which were described above. Referring to FIG. 15, a communication node 1500 may comprise at least one processor 1510, a memory 1520, and a transceiver 1530 connected to the network for performing communications. Also, the communication node 1500 may further comprise an input interface device 1540, an output interface device 1550, a storage device 1560, and the like. The respective components included in the communication node 1500 may communicate with each other as connected through a bus 1570.

However, each component included in the communication node 1500 may be connected to the processor 1510 via an individual interface or a separate bus, rather than the common bus 1570. For example, the processor 1510 may be connected to at least one of the memory 1520, the transceiver 1530, the input interface device 1540, the output interface device 1550, and the storage device 1560 via a dedicated interface.

The processor 1510 may execute a program stored in at least one of the memory 1520 and the storage device 1560. The processor 1510 may refer to a central processing unit (CPU), a graphics processing unit (GPU), or a dedicated processor on which methods in accordance with embodiments of the present disclosure are performed. Each of the memory 1520 and the storage device 1560 may be constituted by at least one of a volatile storage medium and a non-volatile storage medium. For example, the memory 1520 may comprise at least one of read-only memory (ROM) and random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A beam fingerprint-based positioning method, performed by a communication node located in a target space, the beam fingerprint-based positioning method comprising:
   performing measurements on positioning signals transmitted from at least one reference node through a plurality of directional beams in a beam sweeping scheme;
   transmitting a result of the measurements to a central node; and
   receiving information on a position of the communication node from the central node,
   wherein the central node selects at least one beam least affected by an environmental change among the plurality of directional beams by inputting the received result of the measurements to learning models each of which is generated for each of the plurality of directional beams at each of a plurality of reference positions existing in the target space, and determines an estimated position of the communication node based on learning models for reference positions for the selected at least one beam and the received result of the measurements.

2. The beam fingerprint-based positioning method according to claim 1, wherein the central node is one of the at least one reference node.

3. The beam fingerprint-based positioning method according to claim 1, wherein in the performing of the measurements, a received signal strength (RSS), channel state information (CSI), modified CSI, a channel impulse response (CIR), and/or a magnetic field for each of the positioning signals is measured.

4. The beam fingerprint-based positioning method according to claim 1, wherein the information on the position of the communication node is determined based on the estimated position and a result of at least one of an image-based positioning, a radar-based positioning, an Angle of Array (AoA)-based positioning, or a Time Difference of Arrival (TDoA) or Time of Arrival (AoA) positioning for the communication node.

5. The beam fingerprint-based positioning method according to claim 1, wherein the learning models are generated through deep learning using input data collected based on the measurements on the positioning signals transmitted from the at least one reference node through the plurality of directional beams.

6. The beam fingerprint-based positioning method according to claim 5, wherein the input data is collected for various time zones, various seasons, and/or various human-thing environment change scenarios of the target space.

7. The beam fingerprint-based positioning method according to claim 1, wherein the learning models are generated by one reference position node performing measurements on the positioning signals while moving to the plurality of reference positions, or a plurality of reference position nodes performing measurements on the positioning signals, which are respectively located at the plurality of reference positions, and the plurality of reference positions are preconfigured in the target space or determined by the one reference position node or the plurality of reference position nodes.

8. A beam fingerprint-based positioning method, performed by a central node for positioning in a target space, the beam fingerprint-based positioning method comprising:
   receiving, from a communication node, a result of measurements on positioning signals transmitted from at least one reference node through a plurality of directional beams in a beam sweeping scheme;
   determining a position of the communication node based on the result of the measurements; and
   transmitting information on the position of the communication node to the communication node,
   wherein the determining of the position comprises:
   selecting at least one beam least affected by an environmental change among the plurality of directional beams by inputting the received result of the measurements to learning models each of which is generated for each of the plurality of directional beams at each of a plurality of reference positions existing in the target space; and
   determining an estimated position of the communication node based on learning models for reference positions for the selected at least one beam and the received result of the measurements.

9. The beam fingerprint-based positioning method according to claim 8, wherein the central node is one of the at least one reference node.

10. The beam fingerprint-based positioning method according to claim 8, wherein the result of the measurements includes a received signal strength (RSS), channel state information (CSI), modified CSI, a channel impulse response (CIR), and/or a magnetic field for each of the positioning signals.

11. The beam fingerprint-based positioning method according to claim 8, wherein the information on the position of the communication node is determined based on the estimated position and a result of at least one of an image-based positioning, a radar-based positioning, an Angle of Array (AoA)-based positioning, or a Time Difference of Arrival (TDoA) or Time of Arrival (AoA) positioning for the communication node.

12. The beam fingerprint-based positioning method according to claim 8, wherein the learning models are generated through deep learning using input data collected based on the measurements on the positioning signals transmitted from the at least one reference node through the plurality of directional beams.

13. The beam fingerprint-based positioning method according to claim 12, wherein the input data is collected for various time zones, various seasons, and/or various human-thing environment change scenarios of the target space.

14. The beam fingerprint-based positioning method according to claim 12, wherein the learning models are generated by one reference position node performing measurements on the positioning signals while moving to the plurality of reference positions, or a plurality of reference position nodes performing measurements on the positioning signals, which are respectively located at the plurality of reference positions, and the plurality of reference positions are preconfigured in the target space or determined by the one reference position node or the plurality of reference position nodes.

15. A communication node located in a target space, the communication node comprising:
- a processor;
- a memory electronically communicating with the processor; and
- instructions stored in the memory,
- wherein when executed by the processor, the instructions cause the communication node to:
- perform measurements on positioning signals transmitted from at least one reference node through a plurality of directional beams in a beam sweeping scheme;
- transmit a result of the measurements to a central node; and
- receive information on a position of the communication node from the central node,
- wherein the central node selects at least one beam least affected by an environmental change among the plurality of directional beams by inputting the received result of the measurements to learning models each of which is generated for each of the plurality of directional beams at each of a plurality of reference positions existing in the target space, and determines an estimated position of the communication node based on learning models for reference positions for the selected at least one beam and the received result of the measurements.

16. The communication node according to claim 15, wherein the learning models are generated through deep learning using input data collected based on the measurements on the positioning signals transmitted from the at least one reference node through the plurality of directional beams.

17. The communication node according to claim 15, wherein the learning models are generated by one reference position node performing measurements on the positioning signals while moving to the plurality of reference positions, or a plurality of reference position nodes performing measurements on the positioning signals, which are respectively located at the plurality of reference positions, and the plurality of reference positions are preconfigured in the target space or determined by the one reference position node or the plurality of reference position nodes.

* * * * *